(12) United States Patent
Narahashi et al.

(10) Patent No.: US 9,292,239 B2
(45) Date of Patent: Mar. 22, 2016

(54) MAINTENANCE METHOD AND MAINTENANCE APPARATUS OF INFORMATION PROCESSING APPARATUS

(71) Applicants: Masaki Narahashi, Tokyo-to (JP); Sou Miyazaki, Tokyo-to (JP); Yoshikatsu Kamisuwa, Tokyo-to (JP); Reiji Murakami, Kanagawa-ken (JP)

(72) Inventors: Masaki Narahashi, Tokyo-to (JP); Sou Miyazaki, Tokyo-to (JP); Yoshikatsu Kamisuwa, Tokyo-to (JP); Reiji Murakami, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/716,768

(22) Filed: Dec. 17, 2012

(65) Prior Publication Data
US 2013/0163046 A1 Jun. 27, 2013

Related U.S. Application Data

(60) Provisional application No. 61/580,384, filed on Dec. 27, 2011.

(51) Int. Cl.
*G06F 3/12* (2006.01)
*G06F 11/07* (2006.01)

(52) U.S. Cl.
CPC ............ *G06F 3/1229* (2013.01); *G06F 11/079* (2013.01)

(58) Field of Classification Search
CPC .............................. G06F 11/079; G06F 3/1229
USPC ................................................. 358/1.1, 1.15
See application file for complete search history.

(56) References Cited

U.S. PATENT DOCUMENTS

| | | | |
|---|---|---|---|
| 6,735,641 B1 * | 5/2004 | Kobayashi et al. | 710/15 |
| 6,771,385 B1 * | 8/2004 | Iizuka et al. | 358/1.15 |
| 2009/0147299 A1 * | 6/2009 | Tetu | 358/1.15 |
| 2011/0298804 A1 * | 12/2011 | Hao et al. | 345/440 |
| 2012/0176640 A1 * | 7/2012 | Furukawa et al. | 358/1.14 |
| 2013/0070299 A1 | 3/2013 | Narahashi et al. | |
| 2013/0073908 A1 | 3/2013 | Miyazaki et al. | |

FOREIGN PATENT DOCUMENTS

JP 2001-034447 2/2001

* cited by examiner

*Primary Examiner* — Iriana Cruz
(74) *Attorney, Agent, or Firm* — Amin, Turocy & Watson, LLP

(57) ABSTRACT

A maintenance method of an information processing apparatus comprises: acquiring a machine information including an identification information identifying a machine of the information processing apparatus, a group name classifying the machine as an isolated group and the setting value information of multiple setting items of the machine through an external storage apparatus, acquiring a statistical data of the setting item generated for each group based on the setting value information of multiple information processing apparatuses, comparing the machine information with the statistical data according to each setting item whose group name matches, and generating an evaluation information denoting the propriety of the setting value of the machine and displaying the evaluation information from a display processing unit on a display unit.

8 Claims, 12 Drawing Sheets

T5 STATISTICAL DATA LIST

| MODEL NAME | GROUP NAME | SETTING CODE | SAMPLE QUANTITY | AVERAGE VALUE | MODE VALUE | STANDARD DEVIATION | THRESHOLD VALUE |
|---|---|---|---|---|---|---|---|
| Type A | JPN | 1150 | 10000 | 300.5 | 290 | 15.1 | 150,350 |
| Type A | JPN | 1152 | 10000 | 143.3 | 150 | 20.1 | 120,160 |
| ... | ... | ... | ... | ... | ... | ... | ... |
| Type A | JPN | 2160 | 10000 | — | OFF | — | OFF |
| ... | ... | ... | ... | ... | ... | ... | ... |

FIG.4

T1 MACHINE INFORMATION TABLE

| GLOBAL ID | LOCAL ID | SERIAL NUMBER | MODEL NAME | GROUP NAME | ERROR INFORMATION |
|---|---|---|---|---|---|
| 001-0001 | 0001 | AB001 | Type A | JPN | ... |
| 001-0002 | 0002 | AB002 | Type A | JPN | ... |
| 100-0100 | 0003 | AA001 | Model A | JPN | ... |
| 100-0101 | 0004 | AA002 | Model A | JPN | ... |
| 100-0102 | 0005 | AC001 | Model A | JPN | ... |
| 100-0103 | 0006 | AC002 | Model A | JPN | ... |

FIG.5

T2 ERROR INFORMATION TABLE

| LOCAL ID | DRIVE TIME | PRINTED SHEET COUNT | OCCURRENCE TIMES OF JAM | ... |
|---|---|---|---|---|
| 0001 | 10000 | 100 | 3 | ... |

FIG.6

T3 DATABASE COLUMN NAME-LOG DATA TITLE CORRESPONDENCE TABLE

| DB COLUMN NAME | LOG DATA TITLE |
|---|---|
| DRIVE TIME | EXECUTION TIME |
| DRIVE TIME | ACTUAL RUNNING TIME |
| PRINTED SHEET COUNT | PRINTED SHEET COUNT |
| PRINTED SHEET COUNT | PRINTING COUNTER |

FIG.7

T4 SETTING MACHINE LIST

| LOCAL ID | MODEL NAME | GROUP NAME | SETTING CODE | SETTING VALUE |
|---|---|---|---|---|
| 0001 | Type A | JPN | 1150 | 355 |
| 0001 | Type A | JPN | 1152 | 110 |
| ... | ... | ... | ... | ... |

FIG.8

T5 STATISTICAL DATA LIST

| MODEL NAME | GROUP NAME | SETTING CODE | SAMPLE QUANTITY | AVERAGE VALUE | MODE VALUE | STANDARD DEVIATION | THRESHOLD VALUE |
|---|---|---|---|---|---|---|---|
| Type A | JPN | 1150 | 10000 | 300.5 | 290 | 15.1 | 150,350 |
| Type A | JPN | 1152 | 10000 | 143.3 | 150 | 20.1 | 120,160 |
| ... | ... | ... | ... | ... | ... | ... | ... |
| Type A | JPN | 2160 | 10000 | − | OFF | − | OFF |
| ... | ... | ... | ... | ... | ... | ... | ... |

FIG.9

T6 OUTLIER LIST

| SERIAL NUMBER | MODEL NAME | SETTING CODE | SETTING VALUE | AVERAGE VALUE | MODE VALUE |
|---|---|---|---|---|---|
| AB001 | Type A | 1150 | 355 | 300.5 | 290 |
| AB0028 | Model A | 1152 | 110 | 143.3 | 150 |
| CA0101 | Type A | 2160 | ON | − | OFF |
| ... | ... | ... | ... | ... | ... |

FIG.10

T7 SETTING ITEM LIST

| TYPE | SETTING ITEM NAME | TYPE | SETTING ITEM NAME |
|---|---|---|---|
| PROCESS | CHARGED GRID BIAS ADJUSTMENT | SCANNER | PRIMARY SCANNING SHIFT OF CCD |
| PROCESS | HIGH-VOLTAGE MANUAL ADJUSTMENT CHARGED | .... | .... |
| .... | .... | PRINTER | FINE ADJUSTMENT ON ROTATION OF POLYGON MOTOR |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | SYSTEM | DEFAULT SETTING VALUE OF BLANK PAPER DETERMINATION ADJUSTMENT THRESHOLD WHEN POWER SUPPLY IS SWITCHED ON |

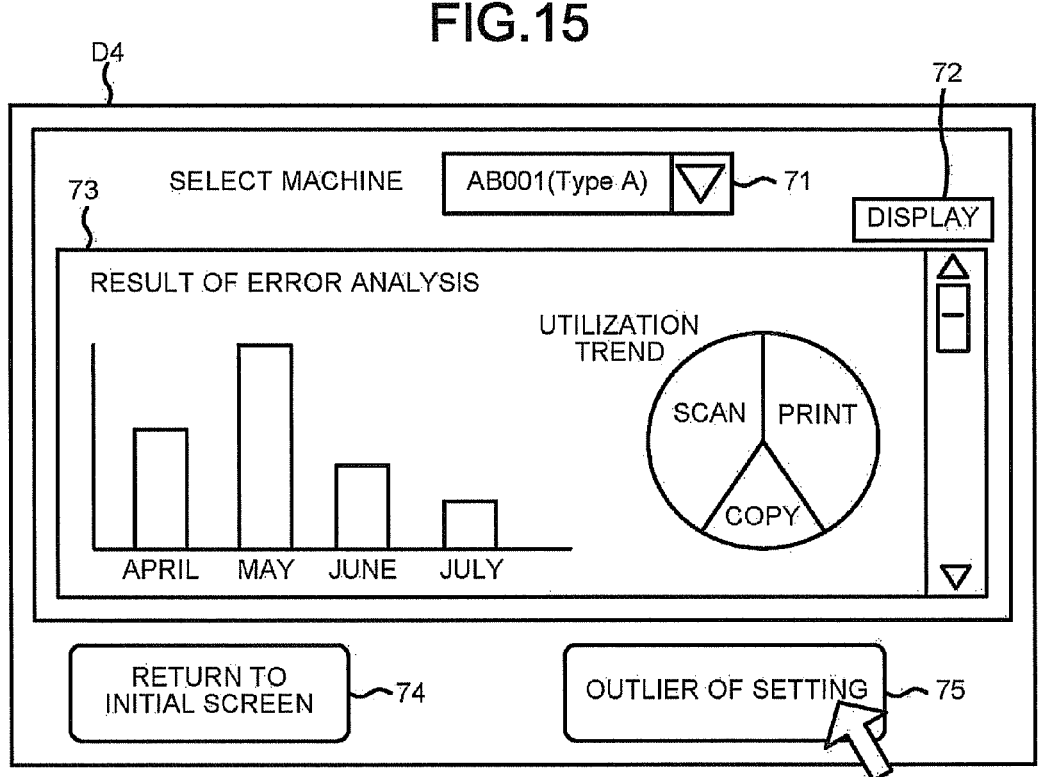
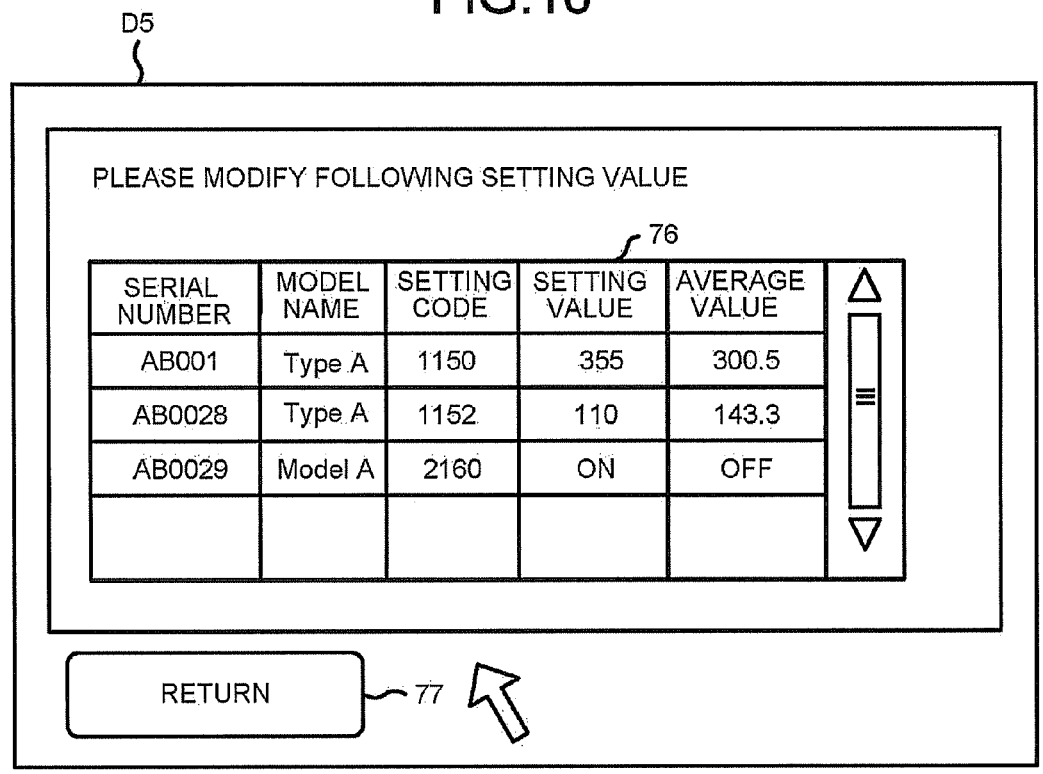

MAINTENANCE METHOD AND MAINTENANCE APPARATUS OF INFORMATION PROCESSING APPARATUS

CROSS-REFERENCE TO RELATED APPLICATION

This application is based upon and claims the benefit of priority from U.S. Provisional Application No. 61/580,384 filed on Dec. 27, 2011; the entire contents of which are incorporated herein by reference.

FIELD

Embodiments described herein relate to a maintenance method and a maintenance apparatus for analyzing an image forming apparatus or an information processing apparatus such as a POS (point of sales) terminal in an offline manner.

BACKGROUND

Conventionally, an image forming apparatus such as an electrophotographic copier forms an image on a paper through a cyclic process involving charging, exposure, development, transfer and fixing. Moreover, the image forming apparatus is maintained by a service person, who is informed of an abnormality in the image forming apparatus by the user by telephone when the abnormality occurs and then goes to the place where the apparatus is installed to confirm the condition. Moreover, each service person takes charge of the maintenance of a plurality of image forming apparatuses.

Moreover, recently, in order to further improve serviceability, a measure using the image forming apparatus in an online status (status of being connected to a communication line such as an internet) and automatically sending the state of a machine and error-relevant information to a service center by utilizing the communication line when the exception of the image forming apparatus was detected was also adopted. For example, a model, a number, the occurrence moment of an error, the state of the machine, and the like, are announced, and the fault diagnosis of the machine is carried out by utilizing these information.

Moreover, in the fault diagnosis process, for example, data for statistical (statistical data) acquired from the plurality of image forming apparatuses and the state of each machine are compared to judge a fault position. However, the following problem always exists, that is, the following problem that the statistical data which should be classified to treat according to a destination and a terrain are mixed into one exists. That is, the image forming apparatus is set the initial values of different action-relevant setting values according to the different destinations, and further, the setting values are different due to the different terrains.

Moreover, the service man can modify the setting value of the machine from a status during the delivery from a factory corresponding to the use frequency and the purpose of the machine, and sometimes, can wrongly set an unexpected value, and in this way, the error of the machine can be caused. Therefore, it is effective that the extent to which the setting value of the machine deviates from a general value can be prompted to the user, and if the initial value of the setting value and the territoriality are not considered, an effective result cannot be acquired.

When the image forming apparatus is maintained, the quantity of machines in an offline status (status of being not connected to the communication line such as the internet) on the market is still quite large. In addition, even though the machine can be connected to the communication line such as the internet, due to a problem on a safety aspect, there are still many machines (for convenience, hereinafter, calling the machine in the status as "machine in the offline state") which do not provide machine information.

Therefore, a method which can carry out the maintenance of the image forming apparatus by collecting the machine information and carrying out proper analysis processing based on the collected machine information even for the machine in the offline status is expected. Moreover, the maintenance is not limited to the image forming apparatus, and the same maintenance is also expected for various information processing apparatuses in the offline status.

BRIEF DESCRIPTION OF THE DRAWINGS

FIG. 4 is a diagram illustrating an example of the machine identification information table T1 of a maintenance apparatus according to the embodiment;

FIG. 5 is a diagram illustrating an example of the error information table T2 of the maintenance apparatus;

FIG. 6 is an explanatory drawing illustrating an example of a database column name-log data title correspondence table T3 of the maintenance apparatus;

FIG. 7 is an explanatory drawing illustrating an example of a machine setting list T4 of the maintenance apparatus;

FIG. 8 is an explanatory drawing illustrating an example of a statistical data list T5 of the maintenance apparatus;

FIG. 9 is an explanatory drawing illustrating an example of an outlier list T6 of the maintenance apparatus;

FIG. 10 is an explanatory drawing illustrating an example of a setting item list T7 of the image forming apparatus as a maintained subject of the maintenance apparatus;

FIG. 15 is an explanatory drawing illustrating an example of a machine information analyzing screen of the maintenance apparatus;

FIG. 16 is an explanatory drawing illustrating an example of an outlier screen set by the maintenance apparatus;

DETAILED DESCRIPTION

In accordance with an embodiment, a maintenance method of an information processing apparatus, comprising: acquiring a machine information including an identification information identifying a machine of the information processing apparatus, a group name classifying the machine as an isolated group and the setting value information of multiple setting items of the machine through an external storage apparatus; acquiring a statistical data of the setting item generated for each group based on the setting value information of multiple information processing apparatuses; comparing the machine information with the statistical data according to each setting item whose group name matches, and generating an evaluation information denoting the propriety of the setting value of the machine and displaying the evaluation information from a display processing unit on a display unit.

Hereinafter, a maintenance apparatus of the informing processing apparatus of a first embodiment is described in detail with reference to the figures. In addition, in each figure, a same symbol is attached to a same position.

The First Embodiment

Figure 1:
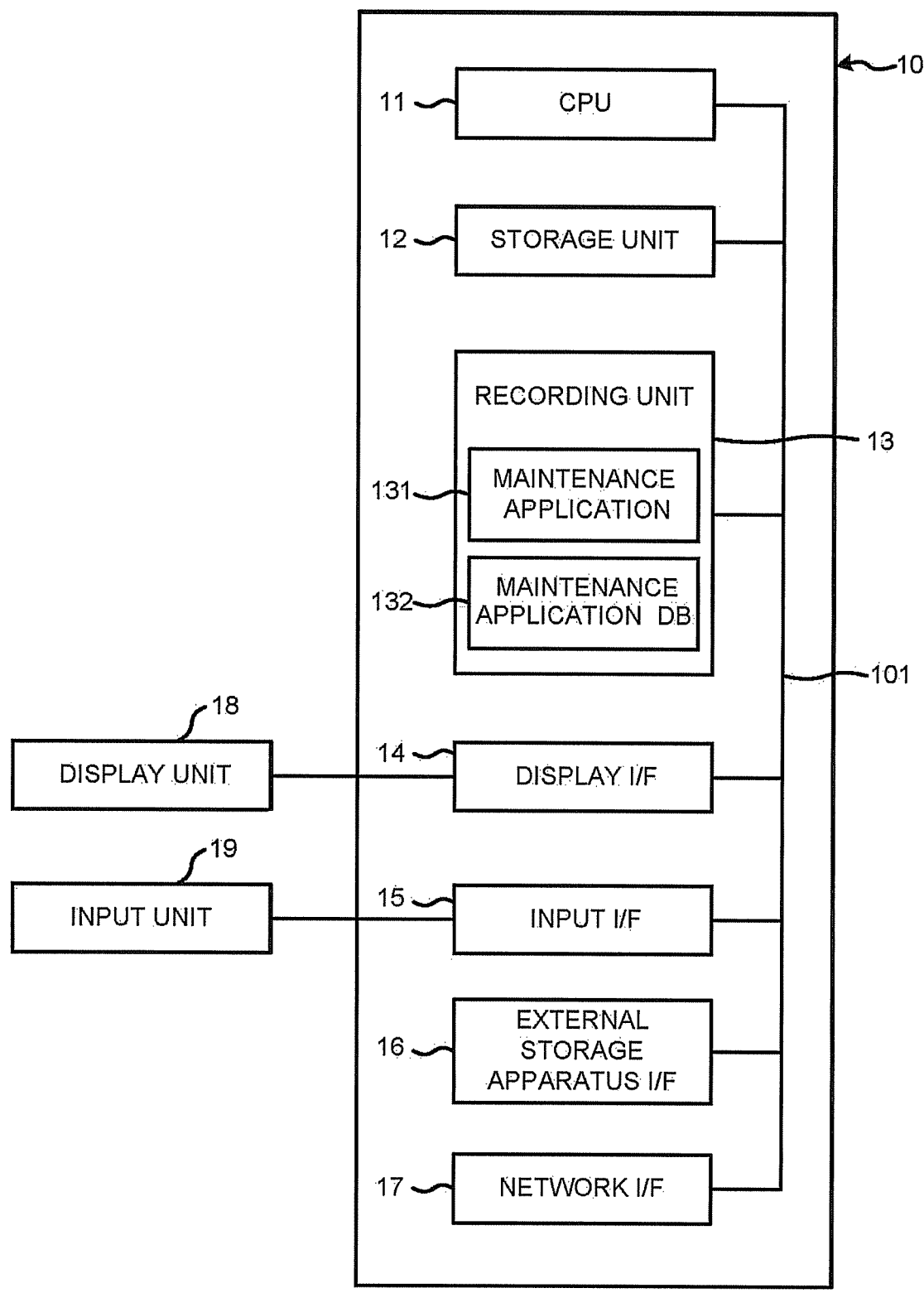
FIG. 1 is a block diagram illustrating an example of the structure of a maintenance apparatus of an embodiment.

FIG. 1 is a block diagram illustrating an example of compositions of the maintenance apparatus 10 of the first embodiment. As shown in FIG. 1, the maintenance apparatus 10 comprises a processing unit 11 such as a CPU, a storage unit 12 such as a memory, a recording unit 13 such as an HDD and, a display interface (I/F) 14, an input interface (I/F) 15, an external storage apparatus interface (I/F) 16 and a network interface (I/F) 17. Moreover, the processing unit 11, the storage unit 12, the recording unit 13, the display I/F 14, the input I/F 15, the external storage apparatus I/F 16 and the network I/F 17 are mutually connected by a bus line 101.

The display I/F 14 is connected to a display unit 18 such as a liquid crystal display and provides image information for the display unit 18 by the display I/F 14. Moreover, the input I/F 15 is connected to an input unit 19 including a mouse, a keyboard and the like and sends an instruction to the processing unit 11 from the input unit 19. The external storage apparatus I/F is an interface between the external storage apparatus. As the external storage apparatus, for example, a pluggable external storage medium such as a USB (Universal Serial Bus) memory is used. Moreover, the network I/F 17 is an interface carrying out communication with a network such as an internet.

Figure 2:
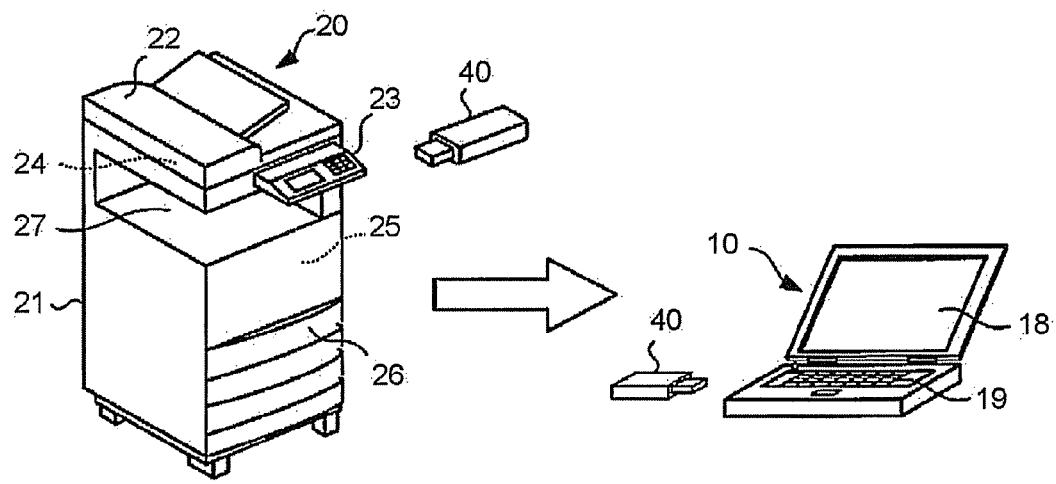
FIG. 2 is an external view illustrating the relationship between an image forming apparatus and a maintenance apparatus according to the embodiment.

Further, as it is premised that the maintenance apparatus 10 is carried by a service person to the place where an image forming apparatus is installed, the maintenance apparatus 10 is preferably in a form portable to the service person, for example, in a form equivalent to the personal notebook computer shown in FIG. 2.

Moreover, in the first embodiment, as shown in FIG. 2, it is assumed that the setting value information of the image forming apparatus 20 is not only provided to the maintenance apparatus 10 by network 100, but is also provided by the pluggable external storage medium such as the USB (Universal Serial Bus) memory 40 in an offline manner.

That is, there are still many offline states (the state that is not connected with a communication line such as the Internet) for information processing apparatuses such as image forming apparatuses, additionally, the connection with a communication line such as the Internet leads to some security problems, thus, it is considered to use a great number of machines without providing any machine information.

In addition, the image forming apparatus 20 is hereinafter described as an example of an information processing apparatus; however, a POS (Point Of Sales) terminal can also be described as an example of an information processing apparatus. Furthermore, a compound machine, that is an MFP, is described as an example of the image forming apparatus 20; however, the image forming apparatus 20 may be other image forming apparatus such as a copier, a printer, a scanner, a fax machine and so on.

FIG. 2 is an external view illustrating the relationship between an MFP (image forming apparatus) 20 and the maintenance apparatus 10. An original table, on which an automatic document feeding unit (ADF) 22 is arranged in an openable/closable manner, is arranged on the upper portion of the main body 21 of the MFP 20. Further, an operation unit 23 is arranged on the upper portion of the main body 21. Various operational keys and a touch panel type display unit are contained in the operation unit 23.

A scanner unit 24 is arranged under the ADF 22 inside the main body 21. The scanner unit 24 reads the original fed by the ADF 22 or placed on the original table to generate image data. A printer unit 25 is arranged in the internal center of the main body 21, and a plurality of paper cassettes 26 for accommodating papers of different sizes are arranged on a lower portion of the main body 25.

The printer unit 25 includes a photosensitive drum and laser to process the image data read by the scanner unit 24 and the image data generated by a PC (Personal Computer) to form an image on a paper and fix the image. The paper on which an image is fixed by the printer unit 25 is discharged to a paper discharging unit 27.

A port for connecting, in a pluggable way, a USB memory 40 serving as an external storage apparatus is arranged on one lateral surface of the main body 21 of the MFP 20. The USB memory 40 acquires the machine information of the MFP 20 and other information through the port connected with the MFP 20 and then stores the acquired information therein.

The maintenance apparatus 10 is also provided with a port for connecting the USB memory 40 so as to acquire the information stored in the USB memory 40, such as the machine information of the MFP 20, through the external storage apparatus I/F 16. Thus, the external storage apparatus I/F 16 constitutes a machine information acquisition unit.

Figure 3:
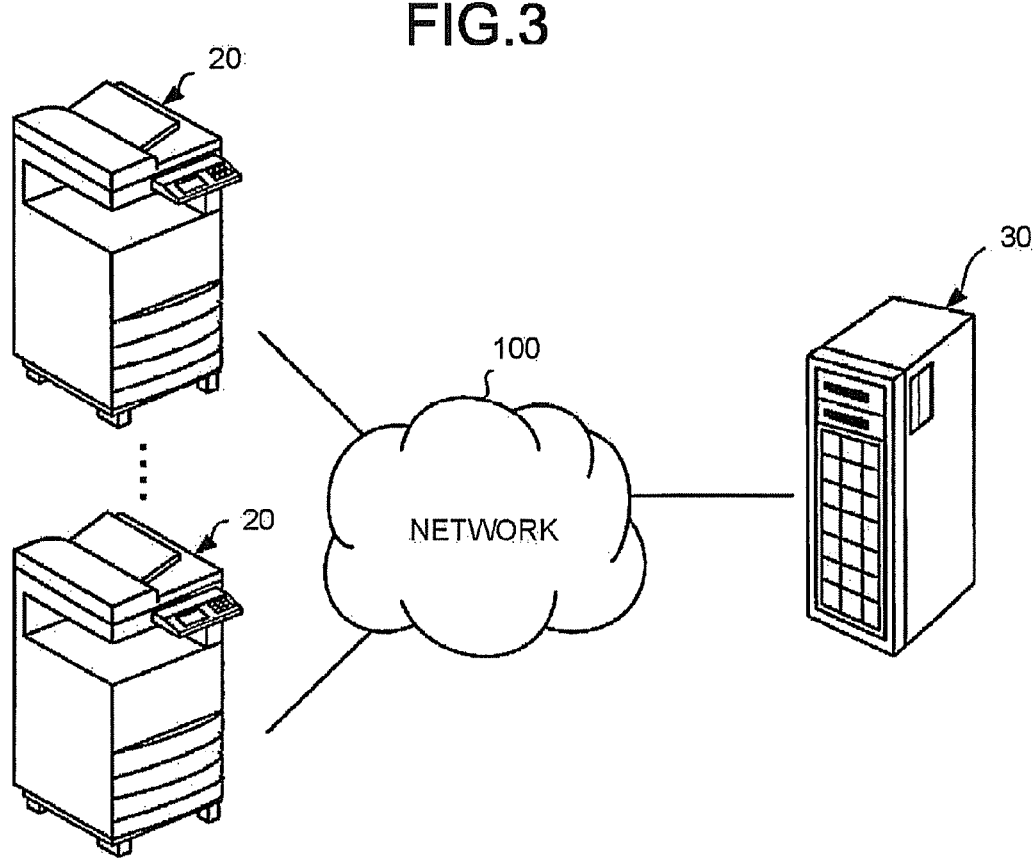
FIG. 3 is a diagram illustrating the relationship between an image forming apparatus and a server according to the embodiment.

FIG. 3 is a diagram illustrating the relationship between the MFP (image forming apparatus) 20 and a server 30. As shown in FIG. 3, one or more MFPs 20 are connected with a network 100 in which a server 30 carrying out information analysis and the like. In the status that the MFP 20 is connected with the network 100, the server 30 automatically collects and stores the machine information including the setting value information of the MFP 20 and makes the statistical data. Moreover, in the server 30, the statistical data can be updated according to the collected and stored setting value information.

The maintenance apparatus 10 acquires the statistical data from the server 30 by the network I/F 17. Therefore, the network I/F 17 forms a statistical data acquirement unit.

The recording unit 13 of the maintenance apparatus of the first embodiment stores a maintenance application 131 (hereinafter called as "application") for the image forming apparatus, and further has a database 132 (hereinafter called as "database") for the maintenance application. A statistical graphic pattern (described hereinafter) stored in the server 30 can be downloaded and stored in the database 132.

The database 132, for example, consists of the following tables (a)-(g):

(a) a machine information table T1 (FIG. 4),
(b) an error information table T2 (FIG. 5),
(c) a database column name-log data title correspondence table T3 (FIG. 6),
(d) a machine setting list T4 (FIG. 7),
(e) a statistical data list T5 (FIG. 8), (f) an outlier list T6 (FIG. 9), and (g) a setting item list T7 (FIG. 10).

The so-called "machine" means the image forming apparatus 20, and the image forming apparatus 20 comprises the MFP, the printer, the scanner, the facsimile and the like.

As shown in FIG. 4, the machine information table T1 includes the columns of the global ID, the local ID, the serial number, the model name, the group name and the error information of the image forming apparatus 20. That is, the machine identification information table T1 is a table containing the identification information of a machine, which contains a global ID serving as a unique identification number assigned to each machine by the server 30, a local ID serving as a sorting number used in machine identification information table T1, a serial number serving as a unique identification number endowed to each machine by the maker of the machine, and the model name of a specific type of machines.

The global ID is a number or a string which is assigned by the server to a machine when the fixed number (serial number) assigned by the maker of the machine to the machine is not fully reliable in the case where the machines of different makers are managed uniformly. Thus, in order to narrow the range of machines to be 1, a global ID is released based on a plurality of necessary items. A specific example of the global ID is, for example, a maker name+ a serial number or a model name+ a serial number.

As shown in FIG. 5, error information table T2 includes a 'local ID' column, a 'drive time' column, a 'printed sheet count' column and a 'Occurrence times of Jam' column for the image forming apparatus 20. That is, error information table T2 contains a local ID serving as a sorting number in machine information table T1, a drive time serving as a machine driving time, printed sheet count indicating the total number of the sheets printed by the machine or the number of the sheets printed in one day, and the Occurrence times of Jam of the paper in the machine.

As shown in FIG. 6, database column name-log data title correspondence table T3 includes a 'database (DB) column name' and a 'log data title' column. The database column name-log data title correspondence table is a correspondence table in which the name of error information changes with the model or maker of the machine. That is, although the title of the error information is different due to the different models and manufacturers, it is thought that the information which is common to some extent can be acquired for each machine along with the progress of data standardization.

Therefore, in order to acquire more information, the database column name-log data title correspondence table T3 (FIG. 6) is used for reducing the difference between the machines to acquire the error information. For example, the drive time corresponds to actual running time or actual operation time, and the printed sheet count corresponds to the printed sheet count or a print counter.

As shown in FIG. 7, the machine setting list T4 includes the local ID as the sorting number in the machine setting list T4, the model name specifying the model, the group name donating the destination and the terrain (such as the Japan, the North America, the Europe and the like), a setting code as a code allocated to the setting item of the image forming apparatus of an evaluated subject, and the setting value as the value set in the setting item.

As shown in FIG. 8, the statistical data list T5 includes the sort of the model name isolating the model, the group name donating the destination and the terrain (such as the Japan, the North America, the Europe and the like), the setting code as the code allocated to the setting item of the image forming apparatus 20, a sample quantity denoting the quantity of samples used when the statistical data are generated, an average value as the average value of the values of the samples, a mode value denoting the value which is the most in the samples, the standard outlier of the sample, and a threshold value used for judging whether or not the setting value is set as an outlier.

As shown in FIG. 9, the outlier list T6 includes the lists of the serial number of the inherent identification number of each machine endowed by the maker, the model name isolating the machine, the setting code as the code allocated to the setting item of the image forming apparatus, the setting value as the value set in the setting item, the average value serving as the average value of the values of the samples, and the mode value illustrating the value which is the most in the samples.

As shown in FIG. 10, the setting item list T7 is a summary of the setting item of the image forming apparatus 20 as the evaluated subject, and is sorted into a process-relevant setting item, a scanner-relevant setting item, a printer-relevant setting item and a system-relevant setting item.

An example of the setting item is denoted in FIG. 10, but the process-relevant setting item comprises: charging grid bias adjustment, high voltage manual adjustment/charging, the high voltage manual adjustment/color development, the high voltage manual adjustment/a primary transfer constant voltage, the high voltage manual adjustment/a secondary transfer constant voltage, the high voltage manual adjustment/anti static blade, the high voltage manual adjustment/a secondary transfer constant current, a charging grid correction voltage value, a development bias correction voltage value, a laser power correction light quantity value, a laser power correction light reference D/A value, V0 sensor output, potential sensor output when a V0 sensor output shutter is closed, laser power output adjustment, a primary transfer bias standard mode executive value, a primary transfer resistance detection shift, a primary transfer front-back end bias executive value, a primary transfer front-back end bias correction coefficient, a secondary transfer bias color executive value, a secondary transfer bias monochrome executive value, a paper surface bias shift, a paper surface/a secondary front-back end bias correction coefficient, a primary transfer constant current trans adjustment value, a primary transfer constant voltage trans adjustment value, a secondary transfer constant current trans adjustment value, a secondary transfer constant voltage trans adjustment value, an anti static bias adjustment value, the high voltage manual adjustment/anti static blade (high), the high voltage manual adjustment/a primary transfer constant current, a fixing temperature (a heating roller), heater forced ON time, a fixing temperature (a press roller), 1st print pre-running action time, exception processing start fixing temperature setting, a forced heater ON sheet count threshold value, a ready allowable temperature range, Ready Pre-Running/fixing motor deceleration, pre-running action time during a ready period, a fixing temperature during the ready period, ready temperature decrement switching time, an allowable temperature range when the print is started, print action temperature keeping time setting when print is ended, a fixing control temperature lower limit value, print temperature decrement switching time, ready allowable temperature correction when preheating replies, time limit setting when dormancy/preheating replies, a print speed switching temperature, an electric power variable lower limit value, an electric power variable amplitude, a lower limit keeping temperature amplitude when electric power decreases; heating time during a preheating period, control temperature keeping time when the dormancy replies; fixing temperature transfer time during the preheating period and a fixing temperature increment during a preheating transfer period.

The scanner-relevant setting item comprises: a CCD main scanning shift, a scanner subscanning shift, a scanner sub-scanning factor scale, distortion, shading position adjustment, an ADF aligning quantity, ADF feeding speed micro adjustment, ADF transition, ADF front position adjustment, carriage position adjustment when ADF reads.

The printer-relevant setting item comprises: polygon motor rotation micro adjustment, a laser outgoing position, ADU feeding motor speed micro adjustment, cassette transition adjustment, ADU transition adjustment, a top margin, a left margin, a right margin, a bottom margin, the top margin, the left margin, the right margin, the bottom margin, front position adjustment/a CST1 adjustment value, the front position adjustment/a CST2 adjustment value, the front position adjustment/a CST3 adjustment value, the front position adjustment/a CST4 adjustment value, the front position adjustment/a manual paper insertion adjustment value, the front position adjustment/an ADU adjustment value, the front position adjustment/a TLCF adjustment value, the front position adjustment/an OLCF adjustment value, a first cassette/an aligning quantity, a second cassette/the aligning quantity, a manual paper insertion paper feed aligning quantity, a third cassette/the aligning quantity, a fourth cassette/the aligning quantity, an ADU paper feed aligning quantity, a tandem LCF paper feed aligning quantity, press quantity adjustment after manual paper insertion, drum motor speed micro adjustment, photoresist motor speed micro adjustment, transfer belt motor speed micro adjustment, heating roller speed micro adjustment, paper feed motor speed micro adjustment, fixing paper discharge motor speed micro adjustment, a skew shift adjustment value, polygon motor stop time, a paper feed retry time setting value, Manual staple timeout time, and a continuous print interruption appointed time (minute) for position alignment.

The system-relevant setting item comprises the default setting value of a white paper judgment adjustment threshold value when a power supply is switched on.

In the first embodiment, the data recorded in the database 132 are only an example, but an actual composition is not limited to the above example. Moreover, the database 132 can include a single table and can include multiple tables (based on a relevant data model), and the database can be also replaced with a CSV (Comma Separated Value) file and the like.

In the server 30, a plurality of image forming apparatuses 20 connected to the network 100 are managed in a database form, and the image forming apparatus 20 managed by the server 30 can be singly decided independent of the product of self company and the product of other company by setting the serial number and the model name as primary keywords. Moreover, besides the combination of the serial number and the model name, the serial number can be also combined with the manufacturer name and the like.

Hereinafter, the actions of the maintenance apparatus 10 of the first embodiment are described. If the application 131 is started up, the application 131 displays an initial screen on the display unit 18 by the display I/F 14.

Figure 11:
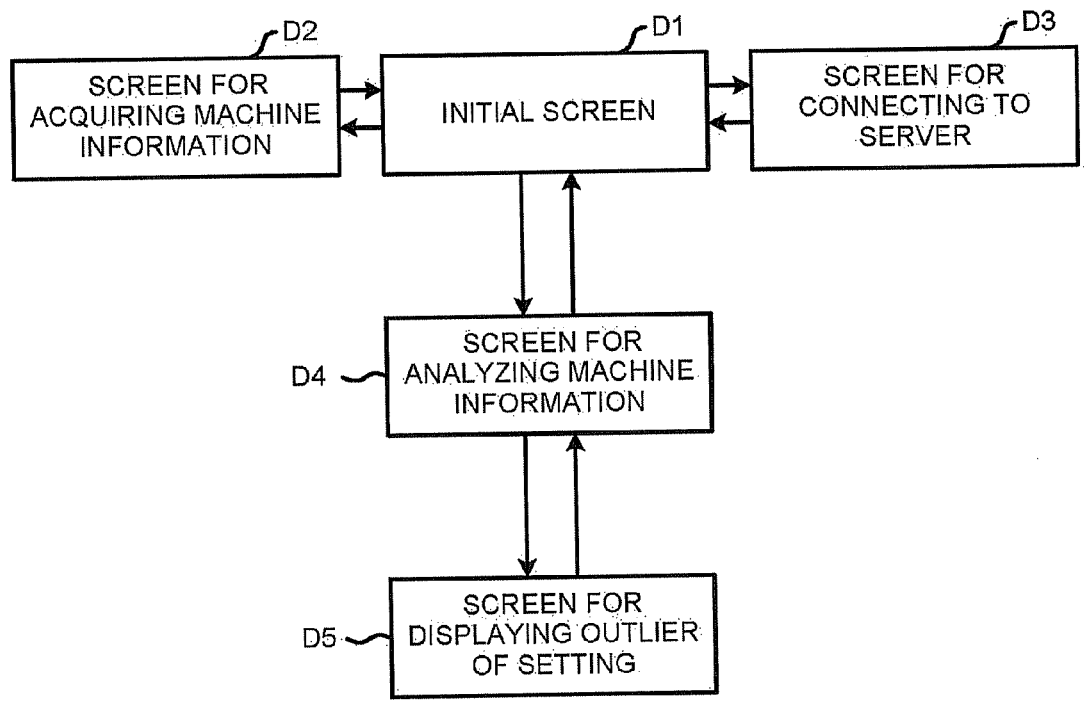
FIG. 11 is an explanatory drawing illustrating an example of the transition of a screen of the maintenance apparatus.

That is, as shown in FIG. 11, the screen of the application of the maintenance apparatus 10 includes plurality of operating screens translating from the initial screen D1. On the initial screen D1, the screen transfers to a machine information acquirement screen D2 after the machine information acquirement is selected, and transfers to a screen D3 of server connection after the server connection is selected. Moreover, the screen transfers to a machine information analysis screen D4 after machine information analysis is selected. Moreover, on the machine information analysis screen D4, the screen translates to an outlier screen D5 of the setting when the outlier display of the setting is selected.

Figure 12:
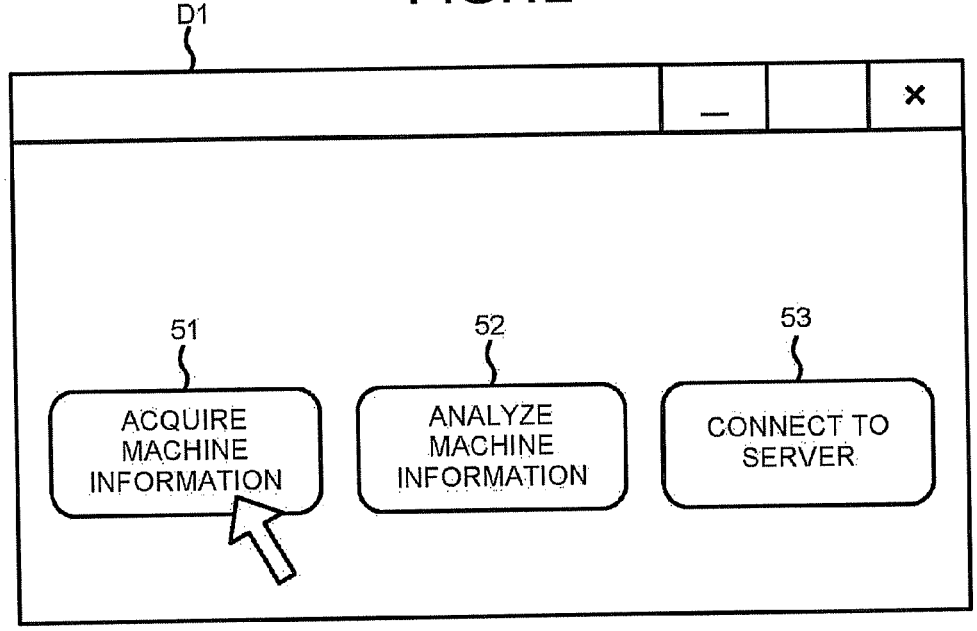
FIG. 12 is an explanatory drawing illustrating an example of an initial screen of the maintenance apparatus.

As shown in FIG. 12, three menus of "machine information acquirement" 51, "machine information analysis" 52 and "server connection" 53 are prepared on the initial screen 50, and the user selects a function to be executed from these menus by operating the input unit 19. If an operation exists, the operation is input into the maintenance apparatus 10 by the input I/F 15.

Figure 13:
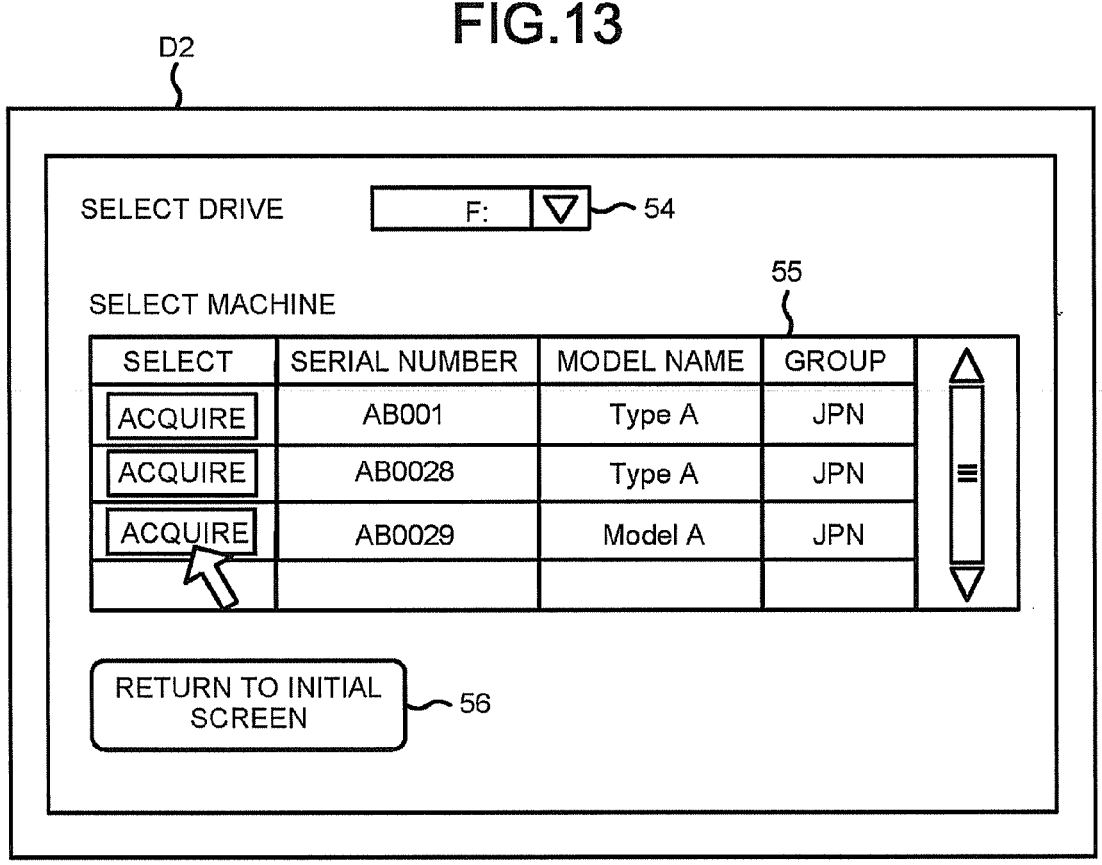
FIG. 13 is an explanatory drawing illustrating an example of a machine information acquiring screen of the maintenance apparatus.

FIG. 13 denotes an example of the machine information acquirement screen D2. As shown in FIG. 13, the machine information acquirement screen D2 includes drive selection 54 appointing the external storage apparatus storing the data of the machine, a machine selection list 55 appointing to input the data of the machine into the database 132 and a button 56 returning to the initial screen.

Figure 14:
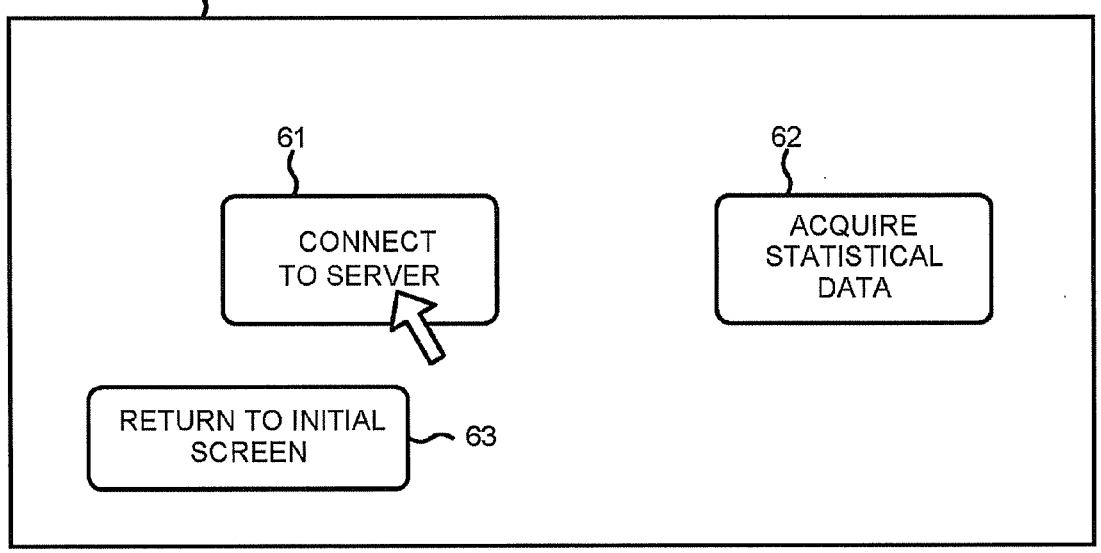
FIG. 14 is an explanatory drawing illustrating an example of a connection screen of connecting the maintenance apparatus with the server.

FIG. 14 denotes an example of the screen D3 of the server connection. As shown in FIG. 14, a server connection button 61 and a statistical data acquirement button 62 are displayed on the screen D3 of the server connection, and the processing is executed if any button is selected. Moreover, a 63 returning to the initial screen button is included.

FIG. 15 denotes an example of the machine information analysis screen D4. As shown in FIG. 15, a machine selection button 71, a display button 72, an analysis result display unit 73, a "returning to the initial screen" button 74 and an outlier button value 75 of the setting are displayed on the machine information analysis screen D4.

FIG. 16 denotes an example of the outlier screen D5 of the setting. As shown in FIG. 16, an outlier display unit 76 displaying the outlier (described hereinafter) and a return button 77 are displayed on the outlier screen D5 of the setting. If the return button 77 is selected, the machine information analysis screen D4 (FIG. 15) is returned.

If the display button 72 is pressed down on the screen in FIG. 15, the error information of the machine selected in the machine selection list 71 and counter information such as the printed sheet count is analyzed and collected, for example, the trend and the utilization state of the error of the machine are prompted on the analysis result display unit 73 in a diagrammatic form. Moreover, if the "returning to the initial screen" button 74 is selected, the screen transfers to the initial screen D1. If the outlier button 75 of the setting is selected, the screen transfers to the outlier screen D5 of the setting. When the machines which can be displayed are multiple, the machine is selected from the machine selection table 71.

Hereinafter, the actions of the maintenance apparatus 10 of the embodiment are described with reference to flow charts in FIG. 17 to FIG. 20 by centering the processing of acquiring the machine information, acquiring the statistical data and detecting the outlier.

The actions denoted in the following flow charts are executed according to the program of the application 131 stored in the recording unit 13.

<<Machine Information Acquirement>>

On the machine information acquirement screen D2 (FIG. 13), the application utilizes the drive selection 54 to appoint the external storage apparatus, prompts to connect the external storage apparatus such as the USB memory 40 and the like to the external storage apparatus I/F 16, and checks whether or not the data which can be added to the database exist in the external storage apparatus (USB memory 40). In the condition that the data which can be added exist, the serial number and the model name of the machine with the data which can be acquired are added to the machine selection list 55.

Figure 17:
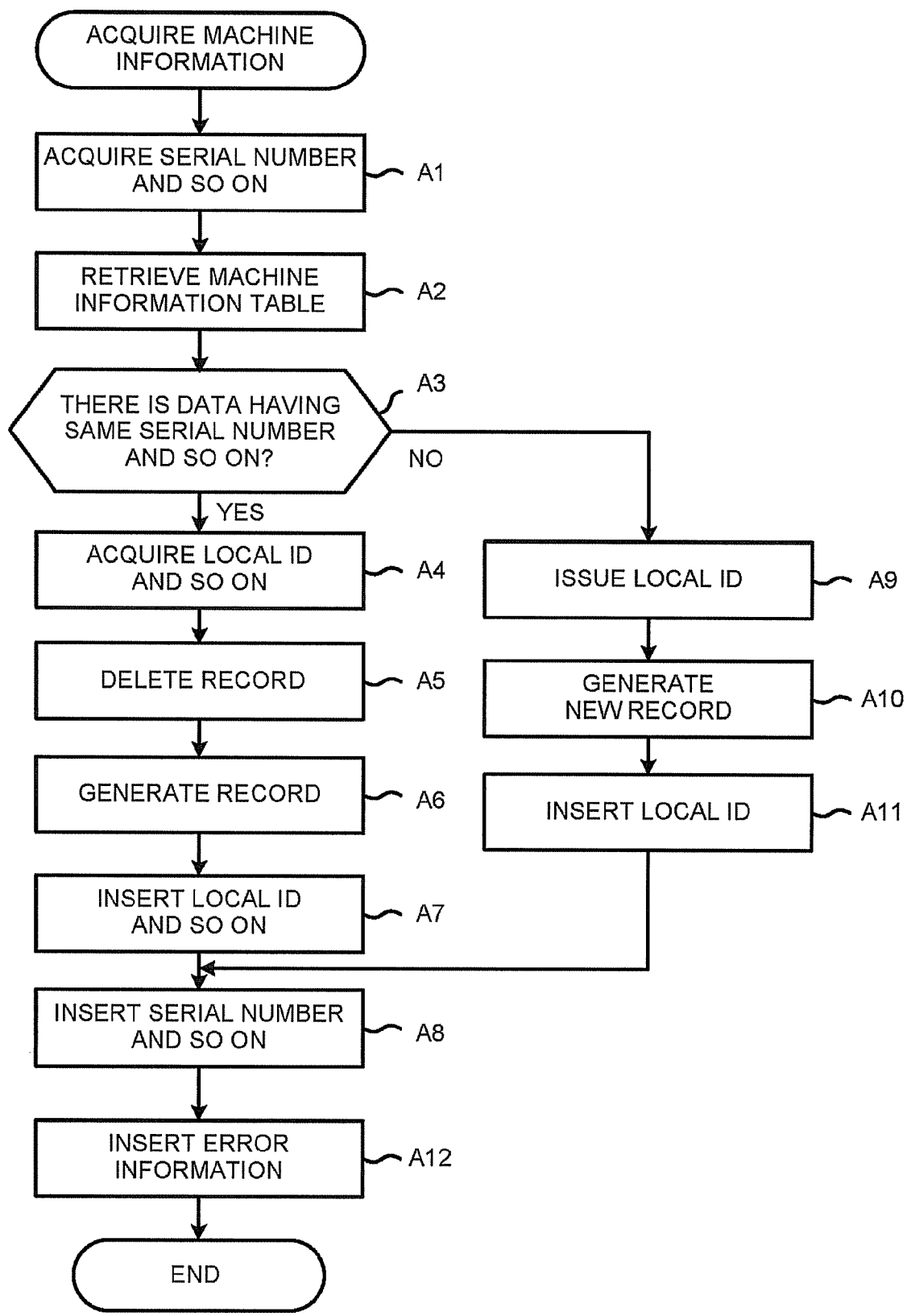
FIG. 17 is a flow chart describing the machine information acquirement actions of the maintenance apparatus.

That is, in the flow chart in FIG. 17, if the data to be acquired are decided, the serial number, the model name, the error information and the setting value information of the selected machine are acquired in an Act A1. In Act A2, the machine information table T1 (FIG. 4) in the database 132 is scanned (retrieved). In Act A3, the data of the machine the same as the acquired data are detected whether or not to exist by means of the serial number and the model name. At the moment, the application 131 scans the serial numbers and the model names of the acquired data and the data in the database 132.

For the acquired data and the data in the database 132, in the condition that the data whose serial number and model name are consistent exist, the machines are judged as "same machines", and processes to Act A4, and in the condition that the consistent data does not exist, it processes to Act A9.

The reason why the model name is also scanned while the serial number is scanned lies in that the serial number is generally the unique number in the same maker but is not always the unique number if the plurality of makers are taken as the subjects. Therefore, the serial number is not only scanned, but also the model name is also scanned at the same time. Not limited to the model name, a method scanning the maker name and the like while the serial number is scanned is also effective. In addition, if the manufacturer of the maintained subject can be guaranteed to be one and the serial number cannot be repeated, the serial number can be also scanned only.

In Act A3, when the machines whose serial numbers and the model names are same exist, in the Act A4, the global ID and the local ID the same as the existing data are issued to the data to be acquired, the existing data (record) are cancelled in Act A5, and the new data (record) are generated in Act A6. The local ID and the global ID of the data to be acquired are inserted in the machine information table T1 in an Act A7. In the condition that the global ID is not allocated, a predetermined value, such as null or −1 and the like, is inserted. In addition, in an Act A8, the serial number, the model name and the group name are inserted into the machine information table T1. The group name is a group name appointed by the machine selection list 55. In addition, the group name can be also automatically designated according to the destination and the terrain besides being appointed by the user by utilizing the machine selection list 55.

In Act A3, in the condition that the machines whose serial numbers and model names are same are judged not to exist, in Act A9, the new local ID is issued. The local ID is decided in a non-repeated way in the application 131. For example, the local ID adopts a positive integer value, and a maximum is increased by one in the issued local ID. In the method, one will be increased when the local ID is issued every time, and therefore, the local ID cannot be repeated.

In Act A10, the new record is generated in the machine information table T1, and in Act A11, the local ID of the data to be acquired is inserted into the machine information table T1. In addition, the serial number, the model name and the group name are inserted into the machine information table T1 in the Act A8.

Subsequently, the application 131 inserts the error information and the setting value information of the machine into the tables T1 and T4 in Act A12 and ends the acquirement processing of the machine information. Although the title of the error information is different due to the different models and makers, it is thought that the information which is universal to some extent can be acquired for each machine along with the progress of the data standardization. Therefore, in order to acquire more information, the database column name-log data title correspondence table T3 (FIG. 6) is used for reducing the difference between the machines to acquire the error information.

<<Server Connection>>

Figure 18:
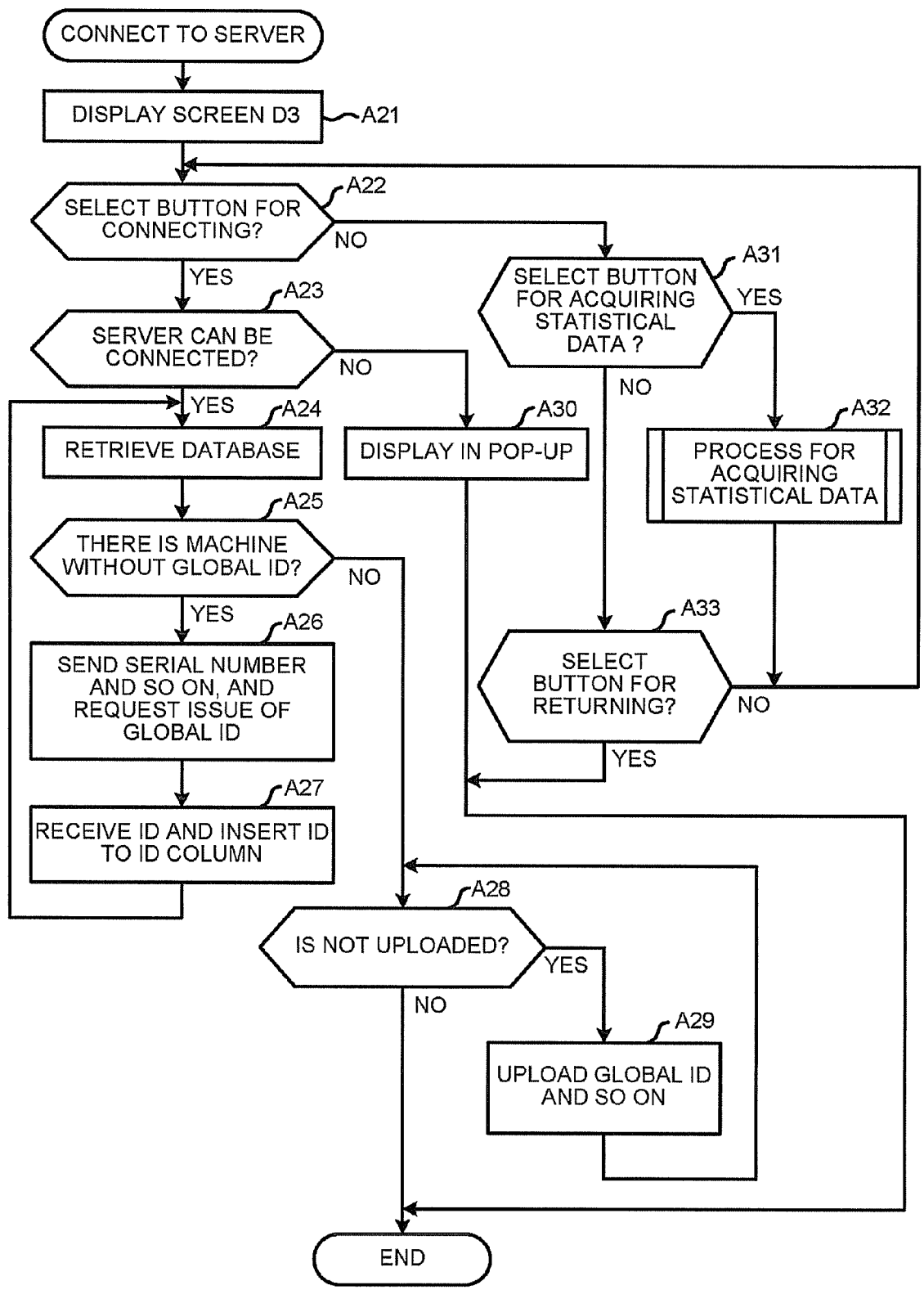
FIG. 18 is a flow chart describing connection actions connecting the maintenance apparatus with the server.

Next, the connection processing of the server 30 is described with reference to the flow chart in FIG. 18. On the initial screen D1 (FIG. 12), if the user selects the "server connection" 53, in Act A21, the screen D3 (FIG. 14) for connecting the server 30 is displayed. Next, in Act A22, if the server connection button 61 is judged to be selected, whether or not the server 30 can be connected to collect the data is confirmed by the network I/F 17 in Act A23.

If that the server 30 that can be accessed is confirmed, in Act A24, the machine information table T1 in the database 132 is retrieved, and in Act A25, the data to which the global ID is still not allocated are detected whether or not to exist.

In the condition that the data to which the global ID is still not allocated exist, in Act A26, the serial number and the model name of the machine is sent (uploaded) to the server 30, and the global ID is requested to be issued. If the global ID is issued from the server 30, in Act A27, the issued global ID is received and is inserted into the column of the global ID of the machine information table T1. Hereinafter, the processing returns to the Act A24 to repeatedly execute the same processing. If the global ID is allocated to all the machines, in Act A28, the machine which is not uploaded is judged whether or not to exist. If any machine left not being uploaded, in Act A29, the global ID, the error information, the group name and the setting value information of the machine are uploaded to the server 30. In Act A28, if the machine which is not uploaded does not exist, the screen returns to the initial screen D1.

In Act A23, if that the server 30 cannot be connected is judged, in Act A30, that the server 30 cannot be accessed is displayed by a pop-up window, and it returns to the initial screen D1.

Moreover, in Act A22, if the button connecting the server 30 is not selected, the processing transfers to Act A31. In Act A31, the statistical data acquirement button 62 (FIG. 14) is judged whether or not to be selected, and if the statistical data acquirement button 62 is selected, the acquirement processing of the statistical data is carried out in Act A32. Moreover, if the button 63 (FIG. 14) for returning to the initial screen is selected in Act A33, the screen returns to the initial screen D1.

Figure 19:
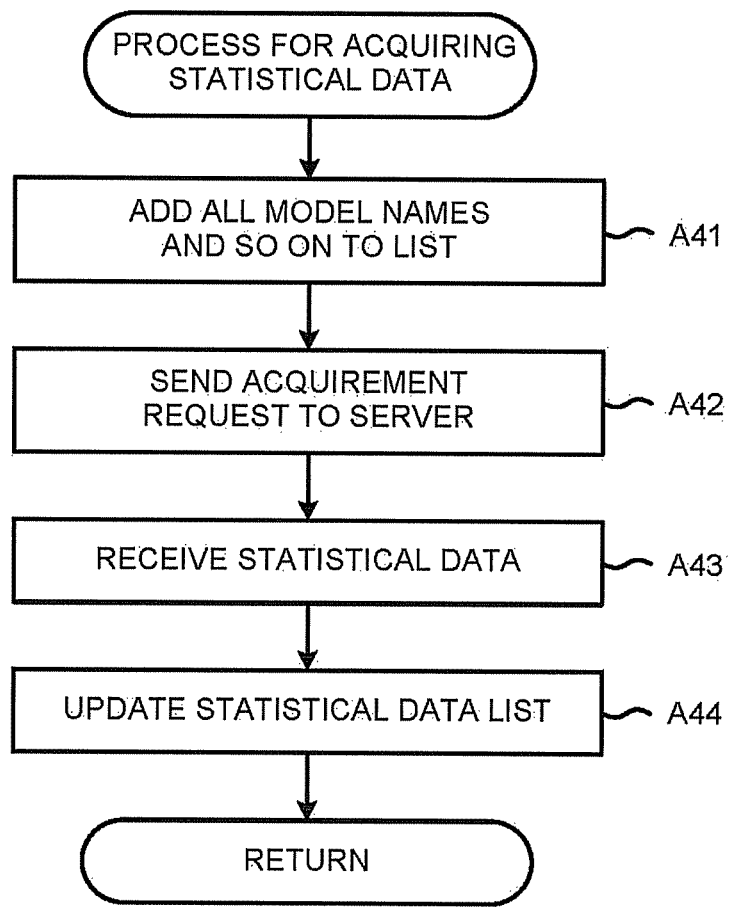
FIG. 19 is a flow chart describing the acquiring actions of the statistical data of the maintenance apparatus.
Figure 20:
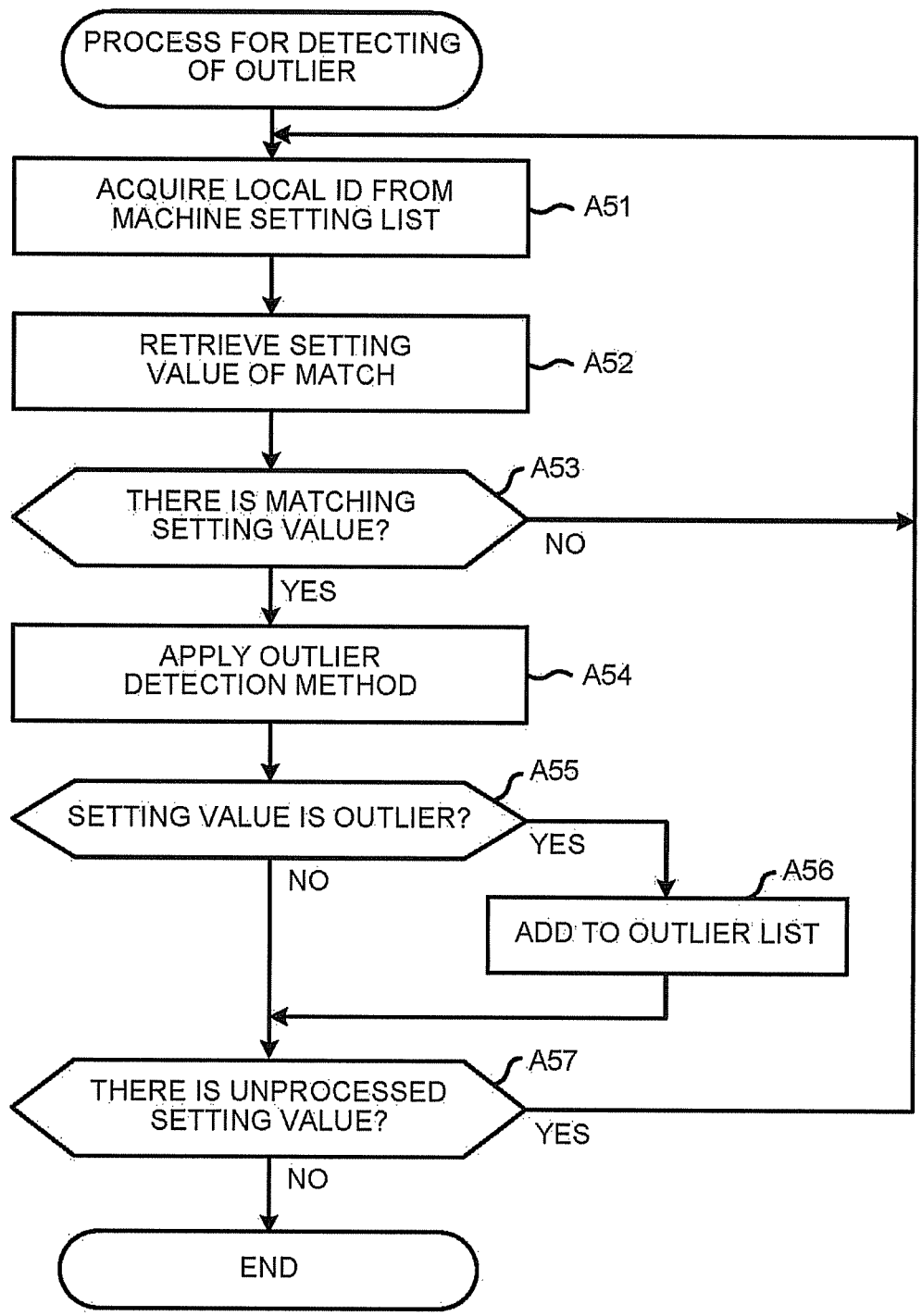
FIG. 20 is a flow chart describing the display actions of the outlier of the maintenance apparatus.

Next, the sequence that the maintenance apparatus 10 acquires the statistical data from the server 30 is described with reference to the flow chart in FIG. 19. If the application 131 selects the statistical data acquirement button 62 on the screen D3 (FIG. 14) for connecting the server, the acquirement processing of the statistical data starts. First, in Act A41, the groups of all the model names and the group names are acquired from the machine information table T1 and are added to the list. However, the repeated list is excluded. In Act A42, the lists of the model name and the group name and the acquirement request of the statistical data are sent to the server 30.

The server 30 sends the pre-calculated statistical data list for the model name and the group name corresponding to a received model name list. The maintenance apparatus 10 receives the statistical data from the server 30 in Act A43. In Act A44, the existing statistical data list T5 (FIG. 8) is updated according to the reacquired statistical data list. therefore, the acquirement processing of the statistical data is ended.

As shown in FIG. 8, the structure of the statistical data list T5 of the setting value includes the model name, the group name, the setting code, the sample quantity, the average value, the mode value, the standard outlier and the threshold value.

<<Outlier Detection Processing>>

If the outlier button 75 of the setting outlier value is selected, on the machine information analysis screen D4, the application 131 executes the outlier detection processing and transfers to the outlier screen D5 of the setting shown in FIG. 16. The outlier is the evaluation information denoting whether or not the setting value of the machine is proper, that is, if the setting value is proper, and the evaluation result of each setting value can be prompted by displaying the evaluation information (outlier) towards the user. In addition, the evaluation information is generated by the processing unit 11. Therefore, the processing unit 11 forms the display processing unit which is generating the evaluation information.

The outlier detection processing can be executed while the machine information is acquired from the external storage apparatus (USB memory 40), and can be also randomly executed by the user towards the acquired data. Hereinafter, the condition of the random execution of the user is described.

The outlier detection processing is implemented by list T4 (FIG. 7) as the subject. The flow chart in FIG. 20 denotes the sequence of the outlier detection processing.

First, the application 131 acquires the local ID, the model name, the group name and the setting code from the machine setting list T4 (FIG. 7) in Act A51. Subsequently, in Act A52, the setting value of a row whose model name, group name and setting code are consistent is retrieved from the statistical data list T5 (FIG. 8). If the consistent setting value is judged to exist in Act A53, an outlier detection method is applied for the average value and the standard outlier. In the condition that the consistent setting value does not exist in the Act A53, the processing is returned to the Act A51 to turn to process the next setting code.

In an Act A54, if the average value is not calculated with a nominal scale for the setting item, the mode value is acquired, and if the setting value is inconsistent with the mode value, the setting value is set as the outlier value. In Act A55, whether or not the setting value is the outlier is judged, and if the setting value is judged as the outlier, it processes Act A56. In Act A56, the row whose local ID matches is retrieved from the machine information table T1 (FIG. 4) to acquire the serial number, and the serial number, the model name, the setting code, the setting value and the mode value are added to the outlier list T6 shown in FIG. 9. In an Act A57, whether or not the setting value which is not processed exists is judged, if the setting value which is not processed exists, the processing is returned to Act A51, and the processing is carried out repeatedly until the setting value which is not processed does not exist.

Herein, if the average value exists in the setting value, the outlier detection method is applied. The outlier detection method will be described hereinafter. If the setting value is the outlier, the row whose local ID matches is retrieved from the machine information table T1 (FIG. 4) to acquire the serial number. Afterwards, the serial number, the model name, the setting code, the setting value, the average value and the mode value are added to the outlier value list t6 (FIG. 9). The process so far is implemented for all the model names and the setting codes registered in the machine setting list T4 (FIG. 7).

Hereinafter, the detection method of the outlier value is described: the setting value is assumed to be in accordance with normal distribution, and if the setting value is 3 times of the standard outlier more than the average value, the setting value is regarded as the outlier value. The setting value is set as x, the average value is set as $\mu$, the standard outlier is set as $\sigma$, and the setting value meeting the following conditional expression (1) is the outlier.

$$|x-\mu|/\sigma > 3 \quad (1)$$

The method is an ordinary method for outlier value detection, and the method is usually used. Sometimes, the setting value is not 3 times of the standard outlier, but is 2 times. By setting the setting value as the 2 times, more setting values can be acquired as the outlier values.

A Mahalanobis distance can be also used in the outlier detection. The Mahalanobis distance $D_M$ is defined as an expression (2).

[Mathematical expression 1]

$$D_M = \sqrt{(x-\mu)^T \Sigma^{-1}(x-\mu)} \quad (2)$$

Herein, $\Sigma$ denotes a variance-covariance matrix. Multiple setting values are interrelated, and the expression is used in the condition that the variance-covariance matrix is pre-calculated by the analytical server 30. When the single setting value is evaluated as the setting values which are interrelated do not exist, the Mahalanobis distance is an expression (3).

[Mathematical expression 2]

$$D_M = \sqrt{((x-\mu)/\sigma)^2} \quad (3)$$

If the $D_M$ exceeds the threshold value, the x is decided as the outlier value.

If the range of the recommended setting decided at a design stage exists in each setting item, the value exceeding the range can be regarded as the outlier. If the lower limit of the threshold value is set as $\theta 1$ and the upper limit of the threshold value is set as $\theta h$, the setting value x meeting the following expression (4) is the outlier.

$$X < \theta 1, \theta h < x \quad (4)$$

Hereinbefore, three outlier detection methods are exemplified, that the methods are not limited to those. For example, a method statistically selecting the outlier, such as Smirnov-Grubbs TEST, can be also adopted.

After the outlier detection processing is ended, the content of the outlier list T6 (FIG. 9) is displayed on the outlier display unit 76 in FIG. 16 to remind the user to pay attention. About the setting code without the average value, the setting code is displayed by being replaced with the mode value. The outlier screen of the setting in FIG. 16 is an example, and the setting item which is not normally set is listed for each machine and denotes an index as a setting reference.

In addition, the outlier value is also displayed by using ON, OFF and the like sometimes besides being denoted by using a numerical value. For example, in FIG. 16, the setting code 2160 of the machine with the serial number AB0029 means that the function which is supposed to be OFF usually becomes ON. Therefore, the outlier value as the evaluation information not only can be the numerical value, but also can be outlier information which can prompt and denote whether or not the setting value is proper, and a display form is not limited to the examples shown in the figures.

As described above, in consideration of the territoriality of the setting value caused by the destination, the setting item which is not normally set is listed for the machine and denotes the index (outlier) as the setting reference, and thus, the user can be reminded to modify the setting value to prevent the potential error.

Hereinbefore, as shown in the descriptions, in the maintenance apparatus 10 of the embodiment, the machine information of the image forming apparatus 20 is acquired by the pluggable external storage apparatus such as the USB memory 40. Moreover, based on the statistical information of the market data collected by the server 30, the statistical value of the setting of the machine and the setting value of the machine are compared, and the outlier value (comparison result) is detected and is prompted on the screen of the maintenance apparatus 10.

Therefore, when the service man maintains the image forming apparatus 20 on the spot, the outlier value can be detected and prompted, so that the occurrence of the error can be prevented by adjusting the setting value on the spot.

In addition, the processing shown in the embodiment can be realized by hardware and can be also realized by the application (a computer program) executed by the processing unit 11 such as the CPU and the like and stored in the recording unit 13 such as the memory.

Moreover, in the embodiment, the maintenance apparatus 10 can consist of a single PC, and the maintenance apparatus can also consist of the PC and the server 30. For example, the server has part of the functions of the PC, and various analysis results are displayed on the PC by utilizing the information from the server 30.

The machine as the maintained subject is described by taking the image forming apparatus for example, but the machine as the subject on which the maintenance apparatus carries out maintenance is not limited to the image forming apparatus. For example, the maintenance apparatus can use various information processing apparatuses such as the POS (point of sale) terminal and the like arranged in a commercial facility and the like as the maintained subjects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be generated without outlier from the spirit of the inventions. The accompanying claims and their equivalents are intended to cover such forms or modifications as would fall within the scope and spirit of the inventions.

What is claimed is:

1. A maintenance method of an information processing apparatus, comprising:
    acquiring a machine information including an identification information identifying a machine of the information processing apparatus, a group name classifying the machine as an isolated group and a setting value information as value set in each multiple setting items of the machine through an external storage apparatus;
    acquiring a statistical data including an average value or a mode value of each setting value of the multiple setting items generated for each group based on the setting value information of multiple information processing apparatuses;
    comparing the machine information with the statistical data according to each setting item whose group name matches, and generating an outlier information as an evaluation information denoting the propriety of the setting value of the machine when the setting value information of the machine is excluded in a given threshold value for the average value or the mode value of the statistical data; and
    displaying the outlier information with the average value or the mode value from a display processing unit on a display unit.

2. The maintenance method of the information processing apparatus according to claim 1, wherein the group name included in the machine information is classified according to a destination or a terrain.

3. The maintenance method of the information processing apparatus according to claim 1, wherein the statistical data include the quantity of samples of the machine used when the statistical data are generated, the average value of the samples and the mode value in the samples.

4. The maintenance method of the information processing apparatus according to claim 1, wherein the statistical data are generated by a server which can be connected to multiple information processing apparatuses, and the statistical data are acquired from the server and are compared with the setting value information of the machine information.

5. The maintenance method of the information processing apparatus according to claim 1, wherein the statistical data is updated corresponding to the setting value information collected from the multiple information processing apparatuses.

6. A maintenance apparatus of an information processing apparatus, comprising:
    a machine information acquirement unit configured to acquire a machine information including an identification information identifying a machine of the information processing apparatus, a group name classifying the machine as an isolated group and the setting value information as value set in each multiple setting items of the machine through an external storage apparatus;
    a statistical data acquirement unit configured to acquire a statistical data including an average value or a mode value of each setting value of the multiple setting items generated for each group based on the setting value information of a multiple information processing apparatuses;
    a display processing unit configured to compare the machine information with the statistical data according to each setting item whose group name matches, and generate an outlier information as an evaluation information denoting the propriety of the setting value of the machine when the setting value information of the machine is excluded in a given threshold value for the average value or the mode value of the statistical data; and
    a display unit configured to display the outlier information with the average value or the mode value from the display processing unit on a display unit.

7. The maintenance apparatus of the information processing apparatus according to claim 6, wherein the group name included in the machine information is classified according to a destination or a terrain.

8. The maintenance apparatus of the information processing apparatus according to claim 6, further comprising: a server which can be connected to the multiple information processing apparatuses internally includes a making unit for the statistical data, wherein the display processing unit acquires the statistical data from the server and compares with the setting value information of the machine information.

* * * * *